Patented Sept. 18, 1934

1,973,964

UNITED STATES PATENT OFFICE 1,973,964

PLASTIC COMPOSITION

Vendope L. Pistocco, Fort Worth, Tex., assignor to Screen Advertising, Inc., Dallas, Tex., a corporation of Texas No Drawing. Application September 15, 1932, Serial No. 633,260

4 Claims. (Cl. 106—39)

This invention relates to new and useful improvements in plastic compositions.

One object of the invention is to produce an improved plastic composition for use by artists, sign makers, decorators, and the like, in forming colored displays of light, heavy and embossed characters, which may be packed ready for use, or which may be used as produced, and which will not deteriorate with moderate age.

An important object of the invention is to produce a plastic composition of superior quality, which when dry will be flexible and durable and not likely to flake off or crack, and which will adhere to pervious and impervious or foraminous surfaces, whether smooth or rough.

A particular object of the invention is to provide a plastic composition which may be applied to form characters and displays which will be opaque and which may be formed of various thicknesses either in solid colors or in layers of different colors to produce an inlaid effect.

Another object of the invention is to produce on improved plastic composition particularly adapted for obtaining highly artistic and pleasing effects when deposited upon transparent, translucent, open mesh, foraminous and pervious mediums, such as are used for theatrical drop curtains, hanging displays and signs, window and door screens, and the like, for producing cut out characters, figures and objects, more or less apparently suspended in open space.

Another object of the invention is to produce a colored plastic composition having a consistency especially adapting it for easy and quick passage through a stencil, and particularly through a stencil carried by a coarse open mesh sheet, but having sufficient body to build up heavy opaque characters, figures, objects and the like, of a self-sustaining nature.

A further object of the invention is to produce a plastic composition for the purposes herein set forth and including coloring material, such as dry colors, colors in oil, or paint pigment, with a base, such as white lead; a thinner and binder, such as linseed oil; a more viscous thinner, binder and hardener, such as spar varnish; a drier, such as japan drier; in some instance a cutting agent, such as turpentine; a retarding agent, such as castor oil or lubricating oil; and a body or thickening agent, which may be any suitable dry nonalkaline comminuted or powdered material, such as wheat flour, corn starch, silicon, and the like, or an admixture of the same, all when properly combined and cured making for the production of a superior compound easily and quickly workable, more or less rapid in drying, and when dry giving a flexible, tough, waterproof, clinging and lasting formation especially artistic and attractive in appearance.

The invention will be more readily understood from a reading of the following specification in which the invention is more particularly set forth.

This application is filed as a continuation in part of my co-pending application filed July 29, 1932, Serial No. 625,629.

In carrying out the invention and producing the composition I employ the various ingredients for performing certain functions and giving particular characteristics to the mixture, therefore, any ingredient capable of giving the desired results may be used. Broadly, the composition includes coloring matter, base material, thinning, binding and hardening agents, a drier and a thickening or body-forming material, and under some conditions a cutting agent and/or a retarding agent may be added.

The exact proportions will vary according to the color used and variation in the proportion of one ingredient will cause a variation in the other ingredients. The particular pigment paste used will cause some variation in the proportions and these may depend upon the liquid medium or vehicle of the pigment paste.

Either or both varnish, preferably spar, and boiled linseed oil may be used with japan drier, as a thinner for the paste pigment, dry color, color in oil and/or white lead, the proportions varying according to the consistency and the characteristics of the mixture. Varnish and linseed oil are both also used as a binder and hardener for uniting the ingredients to form a flexible and tough compound when in a dry state; the varnish being of a fast drying nature and the linseed oil drying slower. The japan drier is of a quick drying character and the nature of the color ingredient and pigment determine its quantity.

I have found in the range of various colors the following general proportions, with 160 ounces of paste pigment of a desired color (or where dry or oil color is used the color and pigment may be half and half or the proportions varied according to the shade desired), mix the following: 20 to 80 ounces of varnish, preferably spar varnish; 5 to 10 ounces of boiled linseed oil; 5 to 20 ounces japan drier; and sufficient comminuted material to form a body of the desired consistency. Where the mixture tends to dry or harden too quickly, from ½ ounce to 5 ounces of castor oil or lubricating oil may be included.

The pigment paste is usually made of white lead which forms a base and coloring matter.

The comminuted material may vary, as good results have been had with both corn starch and wheat flour, and with mixtures of wheat flour and silicon. The body material must be substantially free from alkaline substances, such as lime, caustics, and the like, as well as non-gritty, so as to give a smooth soft mixture. Any farinaceous material, such as powdered wheat flour, corn starch, or the like, may be used. This material is used to give body or bulk to the compound and after being mixed with the other ingredients will cause the mass to swell. Linseed oil dries by oxidation and while acting as a binder also increases in bulk. It is also a drier and when boiled, its drying properties are enhanced. Varnish drys by evaporation and serves a binder and also a hardener. Varnish, drying faster than linseed oil, has a tendency to toughen the compound; while a combination of the oil and varnish produces a mixture which when dry, is hard, pliable and durable. Both the linseed oil and the varnish, as well as the japan drier, act as a thinner.

After the ingredients have been thoroughly mixed, preferably in a mechanical mixer, the compound is exposed to the atmosphere from two to twenty-four hours, depending upon the particular properties and the pigment paste, dry or oil color used. During this period the different ingredients will undergo natural and chemical changes until a homogeneous mass of the proper consistency results. If desired, the composition may be given the consistency of clay, so as to be more readily stored or shipped, and thinned for use; or it may be given a consistency adapting it for ready use. Linseed oil and varnish are used as thinners.

As an example, the following has been found satisfactory for producing a chrome yellow compound:

| | Ounces |
|---|---|
| Paste pigment composed of about 6 pounds of white lead and 4 pounds of chrome yellow pigment | 160 |
| Spar varnish | 80 |
| Boiled linseed oil | 10 |
| Japan drier | 10 |
| Castor oil | 2 |

To the above add sufficient corn starch, wheat flour, or other comminuted material suitable for the purpose, to bring the mixture to the consistency of thick mortar. Let this composition stand in the open for about twelve hours, at the end of which time it will be ready for immediate use or for packing in air-tight containers for storing or shipping. The castor oil will maintain the solids in suspension for a long period of time when packed in air-tight containers. When used immediately, the castor oil may be omitted. When using this mixture, either or both linseed oil and varnish may be added to soften the compound.

Where a bright red or orange colored compound is mixed, such a pigment being of a fast drying nature, a greater amount of linseed oil and a lesser amount of varnish are used. The quantity of castor oil may be increased for retarding the drying, from 3 to 5 ounces giving good results. On the other hand, where the compound is black and is slow drying, greater proportions of varnish and japan drier are required, with less quantity of castor oil, from ½ ounce to 1 ounce being ample. In some mixtures turpentine may be added as a solvent or cutting agent, the same as in ordinary paint.

While I have given certain proportions and named specific ingredients herein, the invention is not to be limited to the same, but ingredients having the natures and characteristics described will produce characters, letters, figures, objects and displays, particularly on pervious mediums, which when dry will be flexible, tough and durable and adverse to chipping, cracking or crumbling through use. Also the compound will adhere permanently to its supporting surface or medium.

It is pointed out that the particular color selected will require changes in the proportions, because some pigments cause faster drying than others. Further, it is desirable to produce a comparatively quick drying composition so that the characters which are made therefrom will be tough and pliable and not likely to flake or chip off of the supporting medium. Linseed oil, if given sufficient time, makes an ideal hardener, but in most instances it is not practical to consume the necessary time for complete drying. Varnish dries much more quickly and at the same time hardens the composition. The combination of linseed oil and varnish causes moderately quick drying and gives the characters formed by the composition the desired tough, pliable and viscous nature.

When the compound is mixed, the comminuted material is added last, and where corn starch, wheat flour and the like are used, the same swells as it is mixed with the liquids in the mixer. This gives bulk and body to the composition. After the ingredients are thoroughly mixed the composition continues to work, and this is hastened by exposing it to the atmosphere. This latter step might be termed a curing step, and as before stated usually requires from two to twenty-four hours, depending upon the nature of the pigment.

What I claim and desire to secure by Letters Patent, is:

1. The process of producing a plastic composition which includes mixing a coloring material and white lead with linseed oil and varnish to thin and bind the ingredients and to harden the composition as it dries, mixing into the composition sufficient castor oil to retard the drying and give elasticity to the composition, thickening said mixture with sufficient comminuted farinaceous material to give it bulk and the desired consistency, and exposing the mixture to the atmosphere a sufficient time for it to expand and cure.

2. The process of producing a plastic composition which includes mixing a coloring material and white lead with linseed oil and varnish to thin and bind the ingredients and to harden the composition as it dries, mixing into the composition sufficient castor oil to retard the drying and give elasticity to the composition, increasing the proportion of linseed oil when the coloring material is fast drying to retard such drying, thickening said mixture with sufficient comminuted farinaceous material to give it bulk and the desired consistency, and exposing the mixture to the atmosphere a sufficient time for it to expand and cure.

3. The process of producing a plastic composition which includes mixing a coloring material and white lead with linseed oil and varnish to thin and bind the ingredients and to harden the composition as it dries, increasing the proportion of varnish to hasten the drying when the coloring material is slow drying, mixing into the composition sufficient castor oil to retard the drying and give elasticity to the composition, thickening said mixture with sufficient comminuted farinaceous material to give it bulk and a plastic consistency, and then exposing the mixture to the atmosphere a sufficient time for it to expand and cure.

4. A plastic composition including, 150 to 165 ounces of paste pigment, 20 to 80 ounces of spar varnish, 5 to 10 ounces of boiled linseed oil, 5 to 20 ounces of japan drier, ½ to 5 ounces of castor oil and sufficient powdered farinaceous material to produce a thick plastic mixture.

VENDOPE L. PISTOCCO.